United States Patent [19]

Ramme

[11] 4,234,913
[45] Nov. 18, 1980

[54] LIGHTED BOBBER FOR A FISHING LINE

[76] Inventor: Clarence Ramme, 65G, Aurora, Minn. 55705

[21] Appl. No.: 14,845

[22] Filed: Feb. 26, 1979

[51] Int. Cl.³ ............................................... F21L 7/00
[52] U.S. Cl. .................................... 362/158; 362/186; 362/196; 362/202; 362/203
[58] Field of Search ............... 362/158, 186, 196, 202, 362/203

[56] References Cited

U.S. PATENT DOCUMENTS 4,109,405  8/1978  Ito ........................................ 362/158

*Primary Examiner*—Stephen J. Lechert, Jr.

*Attorney, Agent, or Firm*—Wicks & Nemer

[57] ABSTRACT

The invention includes a housing having a first hollow portion threadedly engaged with a second housing portion has a translucent section and an internal wall formed with a hole through which a light bulb extends. The light bulb has a collar on the base thereof which engages the internal wall. Formed within the first hollow portion is a hollow cylindrical member in which a battery is positioned with a spring positioned between one end of the portion which urges the other end of the battery to contact the base contact of the bulb. A wire contacts the base of the battery with the base of the light bulb.

1 Claim, 3 Drawing Figures

LIGHTED BOBBER FOR A FISHING LINE

SUMMARY

The invention relates to an improvement in bobbers used in fishing which are attached to a fish line. The invention is more particularly directed to a bobber which can be used in night fishing and also day fishing whereby movement of the bobber is easily noticed when a fish attacks the bait on the fishing line. It is an object of the invention to provide a bobber having a housing in which is mounted a light bulb which is operated by a battery also mounted within the housing. The light bulb glows through a translucent portion of the bobber housing thereby allowing the fisherman to notice movement of the bobber while fishing at night.

In the drawings forming part of this application:

Figure 1:
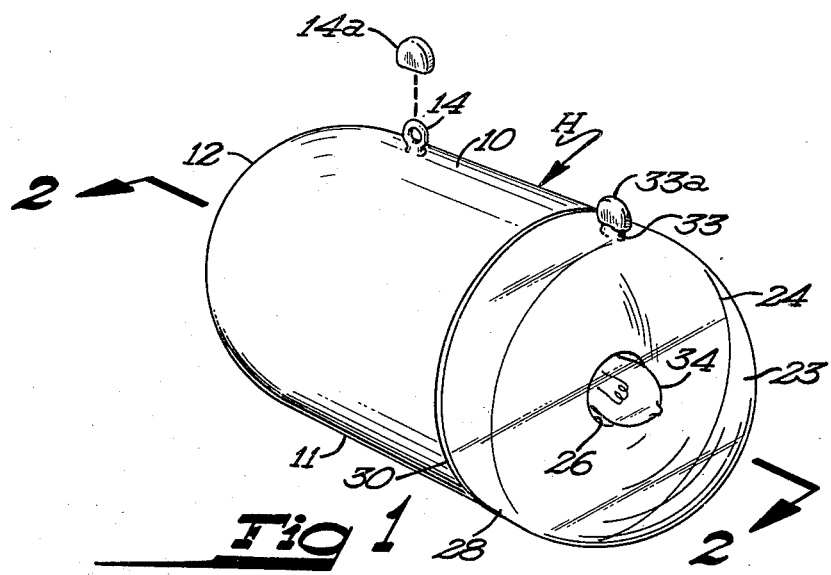
FIG. 1 is a perspective view of a fishing bobber embodying the invention.
Figure 2:
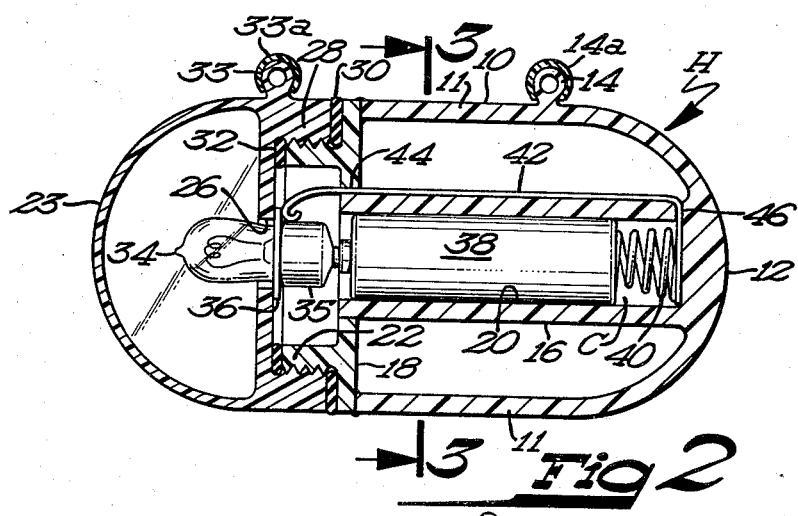
FIG. 2 is a sectional view on the line 2—2 of FIG. 1.
Figure 3:
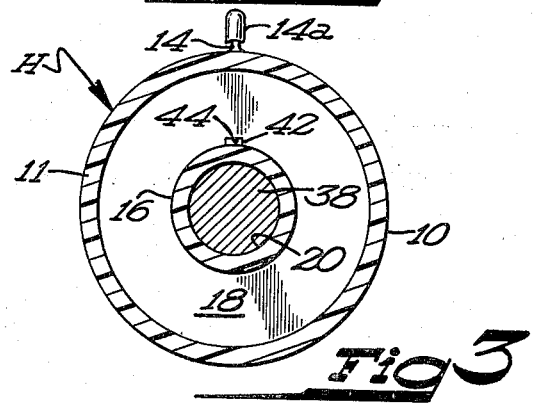
FIG. 3 is a sectional view on the line 3—3 of FIG. 1.

Referring to the drawings in detail, the fishing bobber A includes the housing H. The housing H includes the first hollow portion 10 which is substantially circular in cross-section with a length greater than the diameter of the cross-section. The outer end 12 of the portion 10 is half spherical in formation which terminates in a cylindrical portion. Mounted on the outer surface of the portion 10 is a first eye formation 14. The housing portion 10 may be molded of plastic and includes an axially extending hollow cylindrical portion 16 secured at its inner end to the inner surface of the outer end portion 12 by means of molding, glueing or other conventional means of attachment. The portion 16 forms a battery chamber C.

The inner end of the hollow portion 16 terminates in and is connected to the circular end wall 18 which has the circular opening 20. The numeral 22 designates an annular flange extending axially from the circular end wall 18. The diameter of the flange 20 is greater than the diameter of the circular opening 20 and less than the diameter of the hollow portion 10, and the flange 20 is threaded on its external surface.

The numeral 23 designates a second hollow portion which may be molded of translucent plastic. The portion 23 is substantially half spherical in formation and includes the internal circular wall 24 formed with the axial hole 26. The bobber portion 22 is formed with the internal annular rib 28 which is threaded internally for threaded engagement with the threads of the annular flange 20 for mounting the bobber portion 10 on bobber portion 22. Positioned between the outer edge of the rib 28 and the wall 18 is the gasket 30 for sealing engagement thereof. Additionally there is positioned between the outer edge of the annular flange 22 and the outer surface of the wall 24 the gasket 32 which provides sealing engagement thereof. An eye formation 33 is connected to the hollow portion 23 of the housing.

Further provided is the light bulb 34 having the base 35 on which is mounted the collar 36 the diameter of which is greater than the diameter of the hole 26 which allows abutting engagement of the collar with the wall 24 with the bulb portion extended through the hole 26 with the base 35 of the bulb within the annular flange 22. The numeral 38 designates a conventional battery positioned in the cylindrical member 16, and positioned between the inner end of the battery and the wall of the end portion 12 is the coit opening 40.

With the battery urged against the base of the light bulb by means of the spring, the collar 36 of the bulb base is held against the wall 24 thereby holding the light in place against displacement. A wire 42 extends through the opening 44 formed in the end wall 18 and in contact with the base 35 of the light bulb with the other end of the wire extended through the hole 46 formed in the wall of the cylindrical member 16 and in contact with the spring 40 whereby the circuit is completed for lighting the bulb 34.

The device is assembled by placing the battery 38 in the cylindrical member 16. Then the gasket 30 is positioned on the flange 22, and the gasket 32 within the annular rib 28. Next the hollow portion 23 is screwed upon the portion 10 by means of the threads on the flange 22 and internally of the rib 28, and when that is done, the light bulb lights up and directs light outwardly through the translucent housing portion 23. The bobber is mounted on a fish line by passing the line through and securing it to the eyes 14 and 33 of the bobber.

Having thus described the invention, what is claimed as new and desired to be secured by Letters Patent is:

1. A sealed lighted bobber for a fishing line comprising:
    (a) a two piece housing having
    (b) a first hollow portion and
    (c) a second hollow portion,
    (d) means for removably connecting said first housing portion to said second housing portion in sealing engagement to exclude the atmosphere and render the housing water buoyant,
    (e) said second housing portion having a translucent section,
    (f) means for mounting a light bulb in said second housing portion including a hollow cylindrical member mounted coaxially within and spaced from said second hollow portion,
    (g) means for mounting a battery in said first hollow housing portion to maintain said first hollow housing portion substantially downwardly when the bobber is placed in the water,
    (h) means for causing said battery to contact the base of said light bulb for actuation thereof when said first and second housing portions are connected together, and
    (i) means carried by the housing for connection with a fish line.

* * * * *